United States Patent
Sugino et al.

(10) Patent No.: US 8,872,929 B2
(45) Date of Patent: Oct. 28, 2014

(54) PICTURE IMAGING APPARATUS AND IMAGING CONTROL METHOD

(75) Inventors: Akinobu Sugino, Kanagawa (JP); Nozomu Ozaki, Kanagawa (JP); Masamichi Asukai, Kanagawa (JP); Taiji Ito, Kanagawa (JP); Hidehiko Sekizawa, Tokyo (JP); Akane Sano, Tokyo (JP); Hirotaka Sakaguchi, Tokyo (JP); Yoshiteru Kamatani, Kanagawa (JP); Yoichiro Sako, Tokyo (JP); Itaru Kawakami, Kanagawa (JP)

(73) Assignee: Sony Corporation, Tokyo (JP)

( * ) Notice: Subject to any disclaimer, the term of this patent is extended or adjusted under 35 U.S.C. 154(b) by 861 days.

(21) Appl. No.: 12/214,130

(22) Filed: Jun. 17, 2008

(65) Prior Publication Data

US 2008/0316339 A1      Dec. 25, 2008

(30) Foreign Application Priority Data

Jun. 25, 2007   (JP) ................. 2007-166118

(51) Int. Cl.
*H04N 5/228*   (2006.01)
*H04N 5/76*   (2006.01)
*G03B 7/00*   (2014.01)
*H04N 5/232*   (2006.01)
*H04N 101/00*   (2006.01)

(52) U.S. Cl.
CPC .............. *G03B 7/00* (2013.01); *H04N 2101/00* (2013.01); *H04N 5/23248* (2013.01); *H04N 5/23258* (2013.01); *H04N 5/2327* (2013.01)
USPC ................................ 348/208.99; 348/231.99

(58) Field of Classification Search
USPC ................. 348/209.99, 208.1–208.3, 211.11, 348/219.1, 232.99, 208.99, 231.99
See application file for complete search history.

(56) References Cited

U.S. PATENT DOCUMENTS 4,901,096 A * 2/1990 Lemelson ............... 396/266
5,463,443 A * 10/1995 Tanaka et al. ............ 396/55

(Continued)

FOREIGN PATENT DOCUMENTS

CN       1812501 A        8/2006
JP       63-053531 A      3/1988

(Continued)

OTHER PUBLICATIONS

Hirasawa et al., "Development of Face Image Capturing System for Best Appearance—The Improvement of the Face Detection Algorithm", Institute of Electronics, Information and Communication Engineers Technical Study Reports, Japan, Corporate Judicial Person Institute of Electronics, Information and Communication Engineers, Nov. 11, 2004, vol. 104, No. 449, p. 61-66.

(Continued)

*Primary Examiner* — Roberto Velez
*Assistant Examiner* — Tuan Le
(74) *Attorney, Agent, or Firm* — Wolf, Greenfield & Sacks, P.C.

(57) ABSTRACT

A picture imaging apparatus includes: an imaging means for imaging a subject picture to acquire taken picture data; a storage processing means for performing a storage process of taken picture data acquired by the imaging means; a motion detecting means for detecting motion of the picture imaging apparatus itself; a manipulating means for manipulating a shutter; and a control means for instructing the imaging means to perform a process in accordance with a shutter manipulation at a timing based on a result detected in the motion detecting means during a period during which the shutter is being manipulated by the manipulating means.

7 Claims, 7 Drawing Sheets

(56) References Cited

U.S. PATENT DOCUMENTS

| | | | |
|---|---|---|---|
| 5,708,863 A * | 1/1998 | Satoh et al. | 396/52 |
| 5,734,932 A * | 3/1998 | Washisu | 396/55 |
| 5,826,115 A * | 10/1998 | Washisu et al. | 396/55 |
| 5,905,848 A | 5/1999 | Yano et al. | |
| 5,923,908 A * | 7/1999 | Schrock et al. | 396/85 |
| 5,937,214 A * | 8/1999 | Shintani et al. | 396/55 |
| 6,487,369 B1 * | 11/2002 | Sato | 396/52 |
| 6,677,969 B1 | 1/2004 | Hongo | |
| 7,596,307 B2 * | 9/2009 | Tomita et al. | 396/52 |
| 7,697,836 B2 * | 4/2010 | Pozniansky et al. | 396/159 |
| 7,711,253 B2 * | 5/2010 | Tomita et al. | 396/53 |
| 2001/0010544 A1 * | 8/2001 | Wakui | 348/208 |
| 2004/0130628 A1 | 7/2004 | Stavely | |
| 2005/0046730 A1 | 3/2005 | Li | |
| 2006/0165396 A1 | 7/2006 | Yamazaki | |
| 2006/0171707 A1 * | 8/2006 | Higuma | 396/529 |
| 2006/0257026 A1 | 11/2006 | Shiffer et al. | |
| 2007/0014543 A1 * | 1/2007 | Nakase et al. | 386/107 |
| 2008/0101786 A1 * | 5/2008 | Pozniansky et al. | 396/159 |
| 2008/0231714 A1 * | 9/2008 | Estevez et al. | 348/208.16 |
| 2008/0239092 A1 | 10/2008 | Sugino et al. | |
| 2008/0273798 A1 | 11/2008 | Asukai et al. | |
| 2009/0016645 A1 | 1/2009 | Sako et al. | |
| 2010/0066840 A1 | 3/2010 | Asukai et al. | |

FOREIGN PATENT DOCUMENTS

| | | |
|---|---|---|
| JP | 03-092830 A | 4/1991 |
| JP | 05-142616 | 6/1993 |
| JP | 06-030374 A | 2/1994 |
| JP | 07-043803 A | 2/1995 |
| JP | 07-218970 | 8/1995 |
| JP | 08-110540 A | 4/1996 |
| JP | 10-048681 A | 2/1998 |
| JP | 11-174520 A | 7/1999 |
| JP | 11-205761 A | 7/1999 |
| JP | 2000-132693 A | 5/2000 |
| JP | 2001-197296 A | 7/2001 |
| JP | 2002-023716 A | 1/2002 |
| JP | 2002-049912 A | 2/2002 |
| JP | 2003-110999 A | 4/2003 |
| JP | 2004-062560 A | 2/2004 |
| JP | 2004-120404 A | 4/2004 |
| JP | 2004-134950 A | 4/2004 |
| JP | 2004-242360 | 8/2004 |
| JP | 2005-110004 A | 4/2005 |
| JP | 2005-182526 A | 7/2005 |
| JP | 2005-303511 A | 10/2005 |
| JP | 3740351 B | 11/2005 |
| JP | 2005-352239 A | 12/2005 |
| JP | 2006-50163 A | 2/2006 |
| JP | 2006-197373 A | 7/2006 |
| JP | 2006-201531 A | 8/2006 |
| JP | 2006-202049 A | 8/2006 |
| JP | 2006-202181 A | 8/2006 |
| JP | 2006-203600 A | 8/2006 |
| JP | 2006-221378 A | 8/2006 |
| JP | 2006-279291 A | 10/2006 |
| JP | 2006-319610 A | 11/2006 |
| JP | 2006-330800 A | 12/2006 |
| JP | 2006-331271 A | 12/2006 |
| JP | 2007-166542 A | 6/2007 |
| JP | 2007-249527 A | 9/2007 |

OTHER PUBLICATIONS

Newton, "Philosophiae Naturalis Principia Mathematica" 1687, p. 12-13, vol. 1, Royal Society, London.

* cited by examiner

FIG. 1

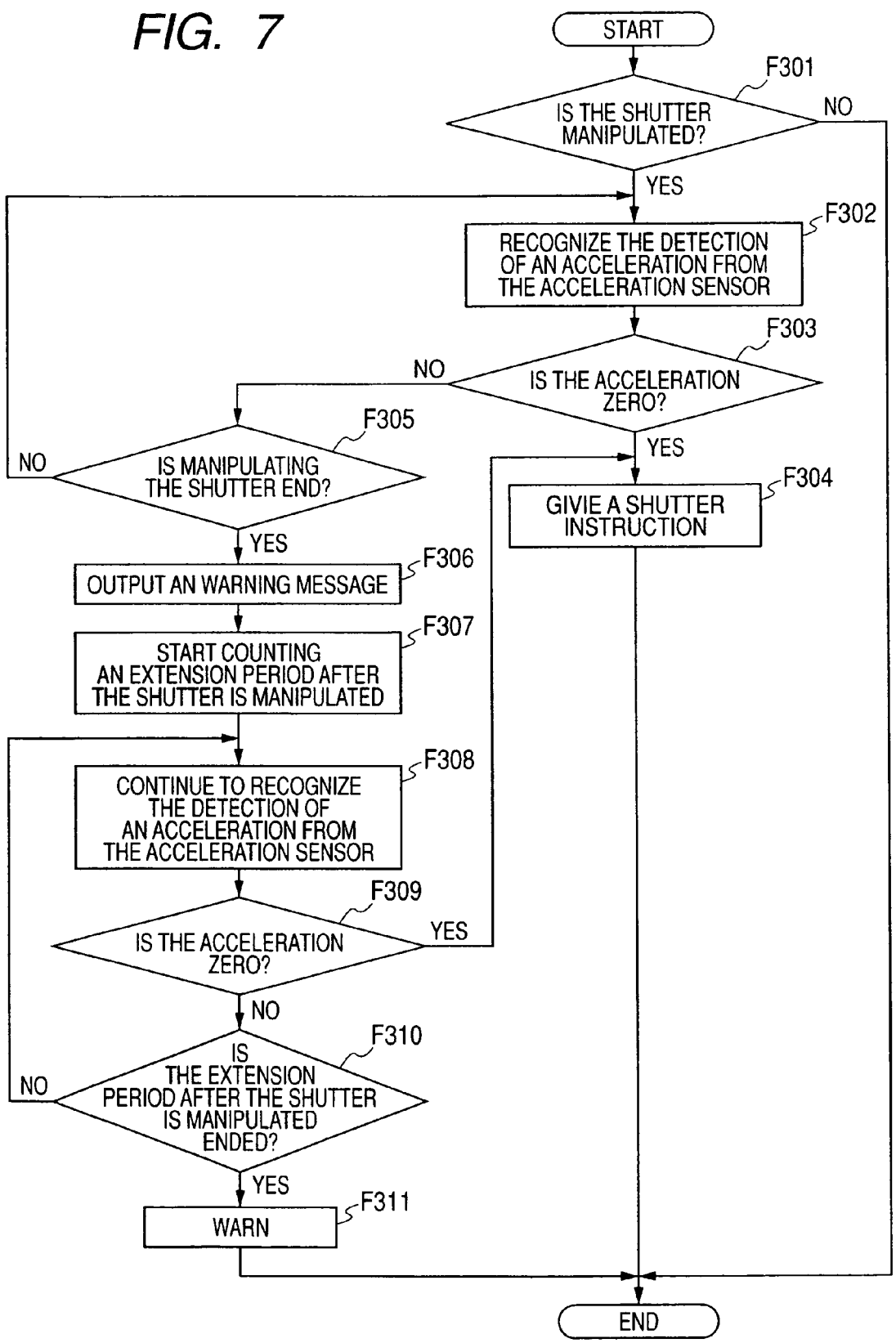

US 8,872,929 B2

PICTURE IMAGING APPARATUS AND IMAGING CONTROL METHOD

CROSS REFERENCES TO RELATED APPLICATIONS

The present invention contains subject matter related to Japanese Patent Application JP 2007-166118 filed in the Japanese Patent Office on Jun. 25, 2007, the entire contents of which being incorporated herein by reference.

BACKGROUND OF THE INVENTION

1. Field of the Invention

The present invention relates to a picture imaging apparatus and an imaging control method, particularly to a technique which solves effects caused by the movement of the hands in taking a picture.

2. Description of the Related Art

Heretofore, for example, when a photographer takes a picture with a picture imaging apparatus such as a digital still camera, a so-called movement of the hands in taking a picture sometimes happens to take a blurred picture. This movement of the hands in taking a picture often happens because in user shutter manipulation, a photographer presses a shutter button to trigger shutter manipulation, which causes a picture imaging apparatus main body to move.

For a technique to avoid the movement of the hands in taking a picture, JP-A-5-142616 (Patent Reference 1) discloses a technique in which the level of pressure in pressing a shutter button is detected to find the situations of camera shake just before operated for predicting camera shake. Then, based on this predicted result, the programmed combinations of the aperture value and the shutter speed are changed as necessary to prevent camera shake.

In addition, JP-A-7-218970 (Patent Reference 2) discloses a technique in which exposure is not permitted until a predetermined time period elapses after a photographer manipulates a shutter, whereby it is prevented to take a blurred picture even though the movement of the hands in taking a picture happens at the time at which the photographer manipulates the shutter.

Furthermore, JP-A-2004-242360 (Patent Reference 3) discloses a technique in which a plurality of primary memories is provided to store picture data before trigger operation to trigger imaging operation and picture data after trigger operation, and picture data at the time at which the shutter is turned on is not used to prevent the movement of the hands in taking a picture.

SUMMARY OF THE INVENTION

However, in the technique described in the Patent Reference 1, camera shake is predicted from the pressure in pressing a shutter button, but it is difficult to cope with camera shake in the case in which camera shake occurs because of factors other than the pressure in pressing a shutter button.

In addition, in the technique described in the Patent Reference 2, it is difficult to avoid a blurred picture caused by the movement of the hands in taking a picture in the case in which the movement of the hands in taking a picture is occurring even after a predetermined time period has elapsed. For example, in the case in which a changeable telephoto lens is mounted on a picture imaging apparatus for taking a picture, since a photographer bears the weight of a picture imaging apparatus main body and as well as the weight of the telephoto lens, the movement of the photographer's hands in taking a picture may not stop even after a predetermined time period has elapsed. Or, also in the case in which the imaging skills of a photographer are simply poor, it can be thought that the movement of the hands in taking a picture is occurring even after a predetermined time period has elapsed.

Furthermore, in the technique described in the Patent Reference 3, it can be thought that the movement of the hands in taking a picture is occurring even before and after the trigger operation.

Thus, it is desirable to avoid degrading the quality of a taken picture caused by the movement of the hands in taking a picture that takes place when a photographer uses a picture imaging apparatus for taking a picture.

A picture imaging apparatus according to an embodiment of the invention is a picture imaging apparatus including: an imaging means for imaging a subject picture to acquire taken picture data; a storage processing means for performing a storage process of taken picture data acquired by the imaging means; a motion detecting means for detecting motion of the picture imaging apparatus itself; a manipulating means for manipulating a shutter; and a control means for instructing the imaging means to perform a process in accordance with a shutter manipulation at a timing based on a result detected in the motion detecting means during a period during which the shutter is being manipulated by the manipulating means.

In addition, the control means may instruct the imaging means to perform a process in accordance with a shutter manipulation at a timing at which a result detected by the motion detecting means showing that motion is stopped is obtained.

Alternatively, the control means may instruct the imaging means to perform a process in accordance with a shutter manipulation at a timing at which a result detected by the motion detecting means showing that it is estimated that motion will be stopped is obtained.

In addition, in addition to a period during which the shutter is being manipulated by the manipulating means, for a predetermined period after a shutter manipulation, the control means may instruct the imaging means to perform a process in accordance with a shutter manipulation at a timing based on a result detected in the motion detecting means.

In addition, the picture imaging apparatus according to the embodiment of the invention may further include: a warning means for outputting warning, wherein when a timing that instructs a process in accordance with the shutter manipulation is not obtained as a timing based on a result detected by the motion detecting means, the control means allows the warning means to output a warning.

An imaging control method according to an embodiment of the invention is an imaging control method of a picture imaging apparatus that performs a process of acquiring an image as a subject picture in accordance with a shutter manipulation and performs a process of storing taken picture data obtained by the image acquiring process, the imaging control method including the steps of: detecting the shutter manipulation; detecting motion of the picture imaging apparatus itself during a shutter manipulation period; and instructing a process in accordance with a shutter manipulation at a timing based on a result detected in the motion detecting step.

According to the embodiment of the invention, the picture imaging apparatus and the imaging control method according to the embodiment of the invention basically perform the processes of acquiring and storing a taken picture in accordance with the shutter manipulation. The picture imaging apparatus sets the timing of instructing the process in accordance with the shutter manipulation based on the motion of the apparatus itself, for example, the detected result of the motion of the picture imaging apparatus itself caused by the movement of the hands in taking a picture. For example, during the period of the shutter manipulation, a process in accordance with the shutter manipulation is instructed at the timing at which the motion becomes the smallest, whereby taken picture data at that timing is extracted and stored.

According to the embodiment of the invention, even though the movement of the hands in taking a picture happens to move the picture imaging apparatus itself at the time at which a photographer manipulates the shutter, taken picture data to be stored is acquired (for example, one frame of taken picture data is extracted which is data to be stored as a still picture) at the timing based on the detected result of the motion of the picture imaging apparatus itself. Therefore, taken picture data can be obtained at the timing at which the motion of the picture imaging apparatus itself is the smallest, that is, taken picture data with no blur can be obtained.

In addition, since the image stabilizing function can be implemented without adding a large scale mechanism or a process for correcting blur, the apparatus configuration and processes can be simplified, and a reduction in costs can be facilitated.

BRIEF DESCRIPTION OF THE DRAWINGS

FIG. 1 shows a block diagram depicting an imaging apparatus according to an embodiment of the invention;

FIG. 7 shows a flow chart depicting an exemplary image stabilizing process III according to the embodiment.

DESCRIPTION OF THE PREFERRED EMBODIMENTS

Figure 2:
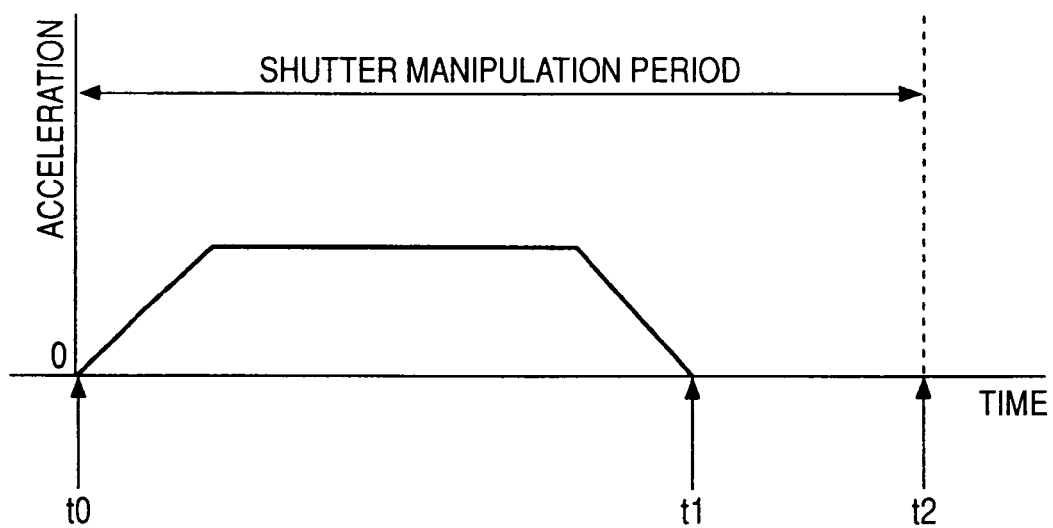
FIG. 2 shows an illustration depicting an exemplary imaging process operation I in the imaging apparatus according to the embodiment.

Hereinafter, embodiments of the invention will be described. Discussions will be given in the following order.
1. Exemplary configuration of an imaging apparatus
2. Exemplary imaging process operation I
3. Exemplary imaging process operation II
4. Exemplary imaging process operation III
5. Modifications
1. Exemplary Configuration of an Imaging Apparatus Here, for an exemplary picture imaging apparatus according to the embodiment, for example, an imaging apparatus as a digital still camera will be taken and described.

Figure 1:
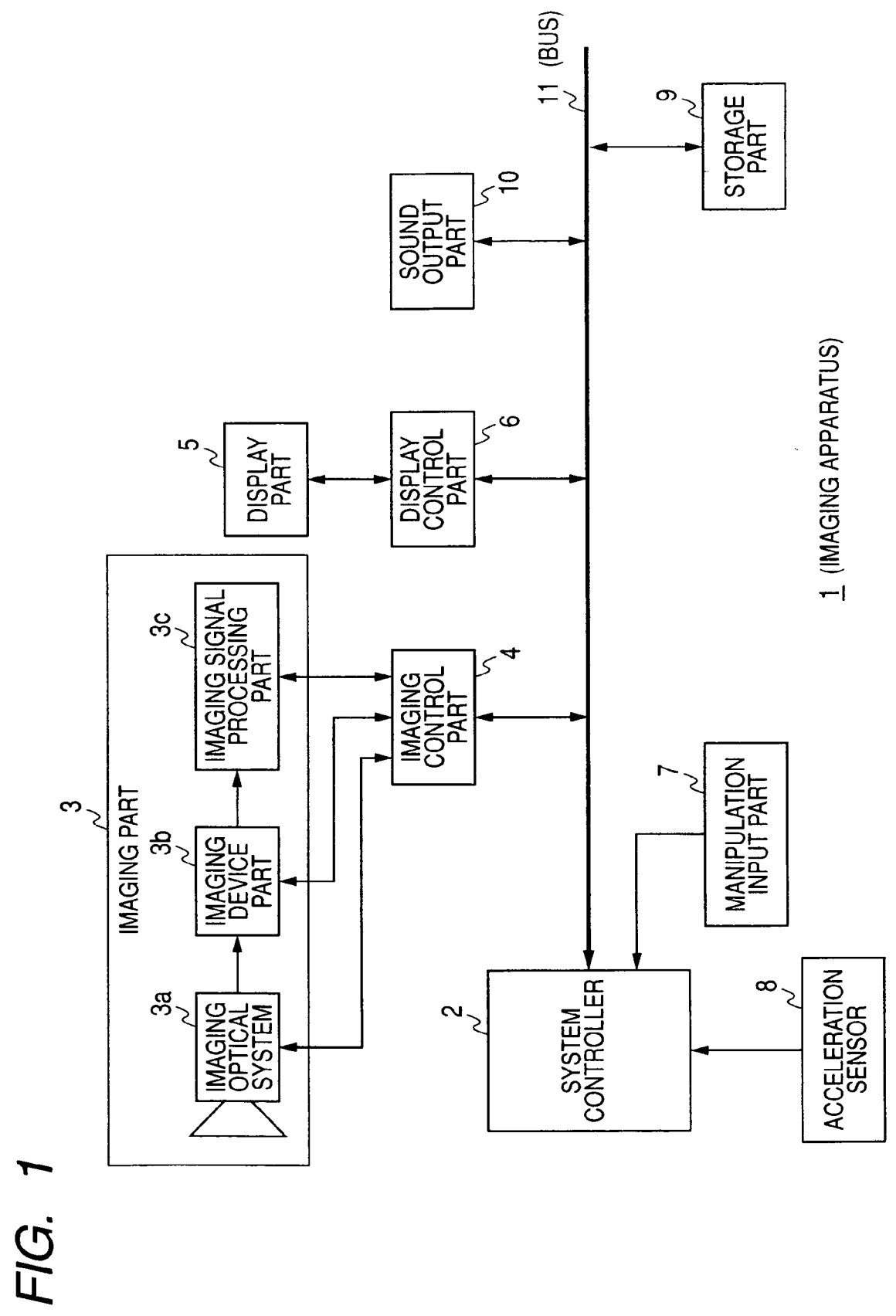

FIG. 1 shows a block diagram depicting the internal configuration of an imaging apparatus 1.

As shown in the drawing, the imaging apparatus 1 has a system controller 2, an imaging part 3, an imaging control part 4, a display part 5, a display control part 6, a manipulation input part 7, an acceleration sensor 8, a storage part 9, a sound output part 10, and a bus 11.

For example, the system controller 2 is configured of a microcomputer having a CPU (Central Processing Unit), a ROM (Read Only Memory), a RAM (Random Access Memory), a non-volatile memory part, and an interface part, which is a control part that controls the overall imaging apparatus 1. Based on a program stored in the ROM, the system controller 2 performs various computing processes, sends and receives control signals with individual blocks through the bus 11, and allows the individual blocks to do necessary operations.

The imaging part 3 has an imaging optical system 3a, an imaging device part 3b, and an imaging signal processing part 3c.

In the imaging optical system 3a in the imaging part 3, a lens system configured of a diaphragm, a zoom lens, and a focus lens is provided as well as a drive system that allows the lens system to do focus operation and zooming operation.

In addition, in the imaging device part 3b in the imaging part 3, a solid state imaging device array is provided that detects imaging light obtained by the imaging optical system 3a for photoelectric conversion to generate imaging signals. For example, the solid state imaging device array is a CCD (Charge Coupled Device) sensor array, or a CMOS (Complementary Metal Oxide Semiconductor) sensor array.

In addition, in the imaging signal processing part 3c in the imaging part 3, a sample hold/AGC (Automatic Gain Control) circuit that adjusts gain or shapes waveforms for the signals obtained by the solid state imaging device and a video A/D converter are provided, in which taken picture data as digital data is obtained. In addition, it performs white balance processing, brightness processing, and color signal processing for taken picture data.

The imaging part 3 having the imaging optical system 3a, the imaging device part 3b, and the imaging signal processing part 3c images pictures and obtains taken picture data.

Picture data obtained through the imaging operation by the imaging part 3 is processed in the imaging control part 4.

Under control performed by the system controller 2, the imaging control part 4 performs a process that converts taken picture data into a predetermined picture data format and a process that supplies the converted taken picture data to the storage part 9 and the display control part 6 in accordance with the situations of operation.

In addition, based on the instruction by the system controller 2, the imaging control part 4 performs on/off control of the imaging operation in the imaging part 3, drive control of the zoom lens and the focus lens in the imaging optical system 3a, control of the sensitivity and frame rate of the imaging device part 3b, parameter control of individual processes in the imaging signal processing part 3c, and the settings of working processes.

For the configuration in which images are represented for a user in the imaging apparatus 1, the display part 5, and the display control part 6 are provided.

The display part 5 is provided with a display drive part that drives a liquid crystal display to display images. The display drive part is configured of a pixel drive circuit that displays picture data supplied from the imaging control part 4 on a liquid crystal display, for example. The pixel drive circuit applies a drive signal based on a video signal to each pixel arranged on the liquid crystal display in a matrix at a predetermined horizontal/vertical drive timing for representations.

Based on control performed by the system controller 2, the display control part 6 drives the pixel drive circuit in the display part 5 to do a predetermined representation. In other words, it allows representations as the imaging monitor in the imaging part 3.

In addition, for these representations, for example, brightness level adjustment, color correction, contrast adjustment, and sharpness (edge enhancement) adjustment can be performed. Moreover, image effect processes can be performed including generating an enlarged image that a part of picture data is enlarged, generating a scale down image, soft focus, mosaic, brightness inversion, partial highlighting of an image (highlighting), and changing the atmosphere of the entire color.

For example, the manipulation input part 7 has operators such as a key, a button, and a dial to form operators for use in on/off manipulation of a power source, on/off manipulation of a image stabilizing function, described later, and shutter manipulation, zooming manipulation, expose setting manipulation, and self-timer manipulation in the imaging system.

The manipulation input part 7 supplies information obtained from these operators to the system controller 2, and the system controller 2 performs necessary computing processes and control corresponding to these items of information.

The acceleration sensor 8 detects the acceleration of the motion of the imaging apparatus 1 itself, and supplies a signal corresponding to the detected acceleration to the system controller 2.

For example, in the case in which a user uses the imaging apparatus 1 to shoot a subject, the acceleration sensor 8 can detect vibrations caused by a so-called movement of the hands in taking a picture that the imaging apparatus 1 itself shakes caused by vibrations of the user hands.

Then, the system controller 2 performs a process that acquires the detected acceleration value of the motion of the imaging apparatus 1 itself as a signal supplied from the acceleration sensor 8.

The storage part 9 is used for storing various items of data. For example, it is used for storing taken picture data.

The storage part 9 may be configured of a RAM or a solid state memory such as a flash memory, or may be configured of a HDD (Hard Disk Drive), for example.

In addition, the storage part 9 may not be a built-in recording medium, which may be a recording and reproducing drive dealing with a recording medium such as a portable recording medium, for example, a memory card having a solid state memory therein, an optical disk, a magneto-optical disk, and a hologram memory.

Of course, a built-in memory such as a solid state memory and a HDD as well as a recording and reproducing drive dealing with a portable recording medium may be both mounted.

Based on control performed by the system controller 2, the storage part 9 records and stores taken picture data.

In addition, based on control performed by the system controller 2, the storage part 9 reads recorded data, and supplies the date to the system controller 2 and the display control part 6.

For example, the sound output part 10 has a sound generating part, a sound synthesizing part, an amplifier circuit and a speaker, which outputs sounds such as a warning sound or a message in accordance with the instruction from the system controller 2. For example, in the case in which the system controller 2 instructs the sound output part 10 to generate electronic sounds or perform speech synthesis, the sound generating part 10 generates a sound signal as a warning sound or a message speech, and amplifies the generated sound signal by the amplifier circuit to output it as sounds from the speaker.

As discussed above, the configuration of the imaging apparatus 1 is described, but this is only an example. Of course, it can be considered that various components may be added or removed in accordance with the operations and functions actually performed.

2. Exemplary Imaging Process Operation I

The imaging apparatus 1 according to the embodiment thus configured performs the operation of an imaging process that implements the image stabilizing function of preventing a taken picture from being blurred because of effects caused by the movement of the hands in taking a picture which is resulted from user's shutter manipulation.

Hereinafter, the operation of the imaging process as the embodiment will be described.

FIG. 2 shows changes in the detected acceleration values of the downward motion of the imaging apparatus 1 detected in the acceleration sensor 8 while a user is manipulating the shutter. In FIG. 2, the horizontal axis depicts time, and the vertical axis depicts the detected acceleration value. In addition, it is the acceleration when the imaging apparatus 1 is moved in the downward direction, but it is the same as the acceleration when the imaging apparatus 1 is moved in the other three directions (the upward direction, the right direction, and the left direction).

Moreover, the time instant at which a user starts manipulating the shutter is indicated as time t0, the time instant at which the user finishes manipulating the shutter is indicated as time t2, and a period from the time t0 to the time t2 is indicated as a shutter manipulation period. For example, the shutter manipulation period is a period about 0.5 second to 2 seconds.

FIG. 2 shows the state in which from the time t0 at which the user starts manipulating the shutter and later, because of effects of the movement of the hands in taking a picture in pressing a shutter key, for example, the imaging apparatus 1 itself is moved to increase the detected acceleration value, and after that, the detected acceleration value is zero at time t1.

Generally, the user is cautious not to move the hands in taking a picture as much as possible in manipulating the shutter. However, since the imaging apparatus 1 itself is often moved more ore less when the user manipulates the shutter in one hand and the user tries not to move the imaging apparatus 1 on the other hand, the detected acceleration value as the motion of the imaging apparatus 1 is often changed as shown in FIG. 2.

In a typical imaging apparatus, a shutter process is performed in accordance with the shutter manipulation. The shutter process is a process that stores one frame of a picture taken at that timing. As described in FIG. 2, this operation is the operation that at the time t0 at which a shutter manipulation is detected, the system controller 2 instructs the imaging control part 4 and the storage part 9 to perform the shutter process. However, in this case, since a time lag also occurs between control and processing, for example, one frame of taken picture data acquired at the timing at which the acceleration is increasing is stored as a still picture of an imaged result. More specifically, a blurred picture is stored.

In contrast to this, in this embodiment, the timing at which the system controller 2 instructs the imaging control part 4 and the storage part 9 to perform the shutter process is decided based on the result detected by the acceleration sensor 8 as shown in FIG. 2 (hereinafter, an event that the system controller 2 instructs the imaging control part 4 and the storage part 9 to perform processes of extracting and storing one frame of taken picture data is referred to as a "shutter instruction").

For example, the system controller 2 gives a shutter instruction in accordance with the value zero detected at the time t1, and performs control over the operation of acquiring/storing taken picture data in accordance with the shutter manipulation.

At the time t1 at which the detected value is zero, it is the state in which the motion of the imaging apparatus 1 itself is stopped and the hands are not moved in taking a picture. Thus, the system controller 2 gives a shutter instruction at this timing to perform control of recording the imaged taken picture data in the storage part 9, and then the taken picture data that avoids effects of the movement of the hands in taking a picture can be stored as a subject picture.

In addition, for example, as shown in FIG. 2, the detected acceleration value does not sometimes become zero within the period in which the user is manipulating the shutter like the period from the time t0 to time t2. Then, it is unable to obtain the timing of giving a shutter instruction. In other words, it is unable to image a picture in accordance with the user shutter manipulation (acquiring/storing taken picture data). In this case, the system controller 2 performs control that outputs a warning sound or a warning message telling that the imaging apparatus 1 is moving in speech from the sound output part 10, for example, whereby the user is notified.

A process performed by the system controller 2 for implementing such operation will be described with reference to FIG. 3.

Figure 3:
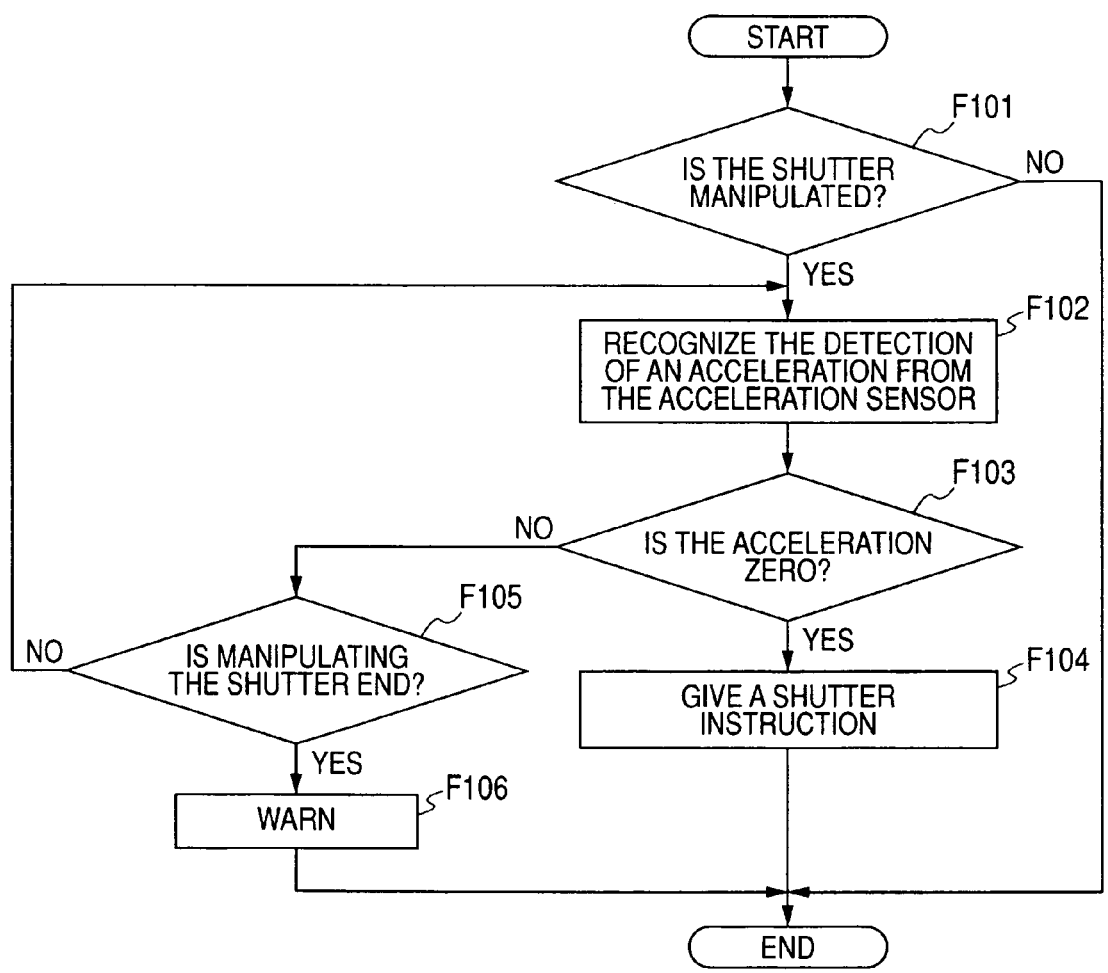
FIG. 3 shows a flow chart depicting an exemplary image stabilizing process I according to the embodiment.

In addition, the process shown in FIG. 3 is performed based on the program stored in the ROM incorporated in the system controller 2 (processes shown in FIGS. 5 and 7, described later, are the same).

Step F101 describes a monitoring process of a shutter manipulation done by the user. If the user manipulates the shutter, the system controller 2 advances the process to Step F102.

In Step F102, the detected acceleration value from the acceleration sensor 8 is confirmed.

Then, in Step F103, it is confirmed whether the acceleration is zero. Here, if it is determined that the detected acceleration value is zero, the process goes to Step F104. On the other hand, if it is determined that the detected value is not zero, the process goes to Step F105.

In Step F105, the system controller 2 confirms whether the shutter manipulation is finished. More specifically, it is determined whether it is the state in which the user releases the shutter key in the manipulation input part 7 (it is determined whether the press of the shutter key is not detected). If the user is still manipulating the shutter, the process returns to Step F102.

For example, as shown in FIG. 2, in the case in which an increase in the acceleration is detected from the time at which the shutter is manipulated, it is not determined that the acceleration is zero.

On this account, the processes in Steps from F103, F105, F102, F103, F105 and so on are repeated while the acceleration is being detected in Step F102.

The acceleration zero is detected at a certain time as the detected result of the acceleration in Step F102, and then the system controller 2 advances the process from Step F103 to Step F104 for giving a shutter instruction.

Thus, the imaging control part 4 extracts one frame of taken picture data obtained in the imaging part 3 at the timing of giving a shutter instruction, performs a predetermined process, and transfers the frame to the storage part 9 for making the frame an imaged still picture. The storage part 9 performs the process that records the transferred one frame of taken picture data on a recording medium. More specifically, "taking a picture" instructed by the shutter manipulation done by the user is to be performed.

In addition, even though the user finishes manipulating the shutter, the acceleration does not sometimes become zero. In this case, the system controller 2 advances the process from Step F105 to Step F106.

In Step F106, the system controller 2 performs an warning process. More specifically, the system controller 2 performs the process that outputs a warning sound or a message telling that the motion of the imaging apparatus 1 is not stopped in speech from the sound output part 10.

For example, in this case, since the process does not reach the shutter instruction in Step F104 and it is unable to "take a picture" desired by the user, it is sufficient that the user is notified of this.

In other words, it is sufficient to tell the user that the warning sound is the sound indicating that taking a picture is failed. Alternatively, such a scheme may be possible in which such a message sound is outputted by synthetic speech that "Taking a picture is failed. Please press the shutter with caution not to move your hands".

The system controller 2 performs the process shown in FIG. 3, whereby taking a still picture can be implemented which avoids effects of the movement of the hands in taking a picture. More specifically, even though the hands are moved in taking a picture when the user takes a picture of a subject with the imaging apparatus 1, a taken picture is stored at the timing at which the movement of the hands in taking a picture is stopped, whereby taken picture data can be obtained which is not affected by the movement of the hands in taking a picture.

In addition, the image stabilizing function like this is not a mechanism provided in the lens system or in the imaging device part 3b, for example, for avoiding effects of the movement of the hands in taking a picture, or a function that corrects the movement of the hands in taking a picture by signal processing for a taken picture. Therefore, the image stabilizing function can be implemented easily at low costs with no addition of a large scale mechanism to the imaging apparatus 1, or no increase in processing efforts.

3. Exemplary Imaging Process Operation II

In the operation of the imaging process that implements image stabilization described above, at the time at which the detected value is zero during the period in which the user is manipulating the shutter, the system controller 2 gives a shutter instruction to control the process of acquiring taken picture data in accordance with the shutter manipulation.

However, in the actual operation, a time lag occurs more or less until the imaging part 3 is allowed to take a picture of a subject after the system controller 2 gives a shutter instruction in response to the event that the detected value is zero. This time lag occurs as the time difference between the stop of the actual motion and the system controller 2 recognizing the acceleration zero, and a time lag between the timing at which the system controller 2 gives a shutter instruction to the imaging control part 4 and the timing at which the imaging control part 4 performs the process of extracting one frame.

Then, because of the time lag, taken picture data as a still picture actually stored in the storage part 9 by the imaging apparatus 1 is a picture at the time slightly shifted from the time instant at which the detected value is zero. Particularly, in the case in which the motion of the imaging apparatus 1 itself is stopped for a moment and then the imaging apparatus 1 is moved, taken picture data can be a picture at the time at which the imaging apparatus 1 begins to move.

It can be considered that effects of the movement of the hands in taking a picture are reduced because of the balance between the shutter speed in the imaging device part 3b and the speed of the motion of the imaging apparatus 1 itself, and then the taken picture data obtained at the time at which the apparatus is moved more or less is substantially a picture with almost no blur. However, it is better that a frame image acquired at the timing of the acceleration zero can be stored as much as possible.

Then, it can be also considered that the imaging apparatus 1 performs the process in which the system controller 2 gives a shutter instruction at the time before the time at which the detected value is zero, and then the extracting/storage process is performed to extract/store picture data of a subject acquired at the timing of the detected value zero. More specifically, a shutter instruction is given at the timing at which such a detected result is obtained that the motion of the imaging apparatus 1 itself is predicted to stop.

The operation of the imaging process like this will be described.

As similar to FIG. 2 described above, FIG. 4 shows changes in the acceleration of the motion of the imaging apparatus 1 detected in the acceleration sensor 8 while the user is manipulating the shutter.

In addition, a period from the time t0 to the time t12 is a shutter manipulation period during which the user is manipulating the shutter, and also as similar to the shutter manipulation period shown in FIG. 2, this shutter manipulation period is a period about 0.5 second to 2 seconds, for example.

Figure 4:
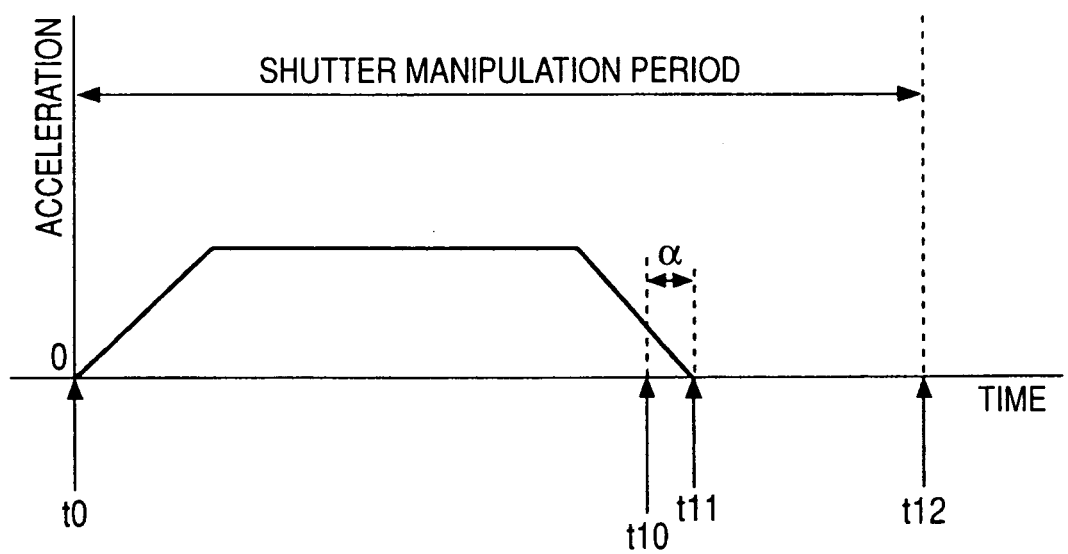
FIG. 4 shows an illustration depicting an exemplary imaging process operation II in the imaging apparatus according to the embodiment.

In the case shown in FIG. 4, the acceleration is increased from the time t0 at which the user starts manipulating the shutter, and after that, the detected acceleration value is zero at time t11. Then, the system controller 2 gives a shutter instruction at the timing of time t10, a predetermined time period α before the time t11.

It is sufficient that this predetermined time period α is computed and stored in advance as a time period (time lag) until the imaging part 3 actually acquires one frame of taken picture data after the system controller 2 gives a shutter instruction.

Then, the system controller 2 gives a shutter instruction at the time t10 at which the detected value will be zero after a predetermined time period α.

However, because the system controller 2 is observing the detected acceleration value, it is necessary to determine the timing a predetermined time period α before from the detected acceleration value. The following scheme can be considered to achieve this.

For example, the system controller 2 computes the rate of increase of the detected acceleration value from the time to as shown in the drawing. Then, suppose the rate of increase (slope) of the detected value is the same as the rate of decease (slope) of the detected acceleration value while the acceleration slows toward the time t11. Based on this assumption, an acceleration value that will be zero after a time period α can be computed. This acceleration value corresponds to an acceleration value at the time t10 in FIG. 4.

Then, the time at which the value reaches the computed acceleration value is detected while the acceleration value is decreasing (while the acceleration is becoming zero), and then it is determined that the time (the time t10 shown in FIG. 4) is the timing of giving a shutter instruction.

Alternatively, such a scheme may be possible in which a predetermined value around the acceleration zero is set in a fixed manner, and when the detected acceleration becomes a predetermined value X around the acceleration zero, it is estimated that the value will become the acceleration zero after a time period α. In this case, it may be considered that the time at which the value becomes a predetermined value X while the acceleration is decreasing corresponds to the time t10 shown in FIG. 4.

As described above, the system controller 2 gives a shutter instruction at the time t10 a predetermined time period α before the time t11 at which the detected acceleration value is zero, and then one frame of the picture at the timing of the time t11 at which the detected acceleration value is zero can be acquired as taken picture data in accordance with the shutter manipulation.

Furthermore, in the case in which a value is not detected at the time that is estimated as the time a predetermined time period α before the time at which the detected acceleration value is zero during the shutter manipulation period of the user, as similar to the case described in FIG. 2, the system controller 2 allows the sound output part 10 to output a warning sound or a warning message by speech in sound output.

Figure 5:
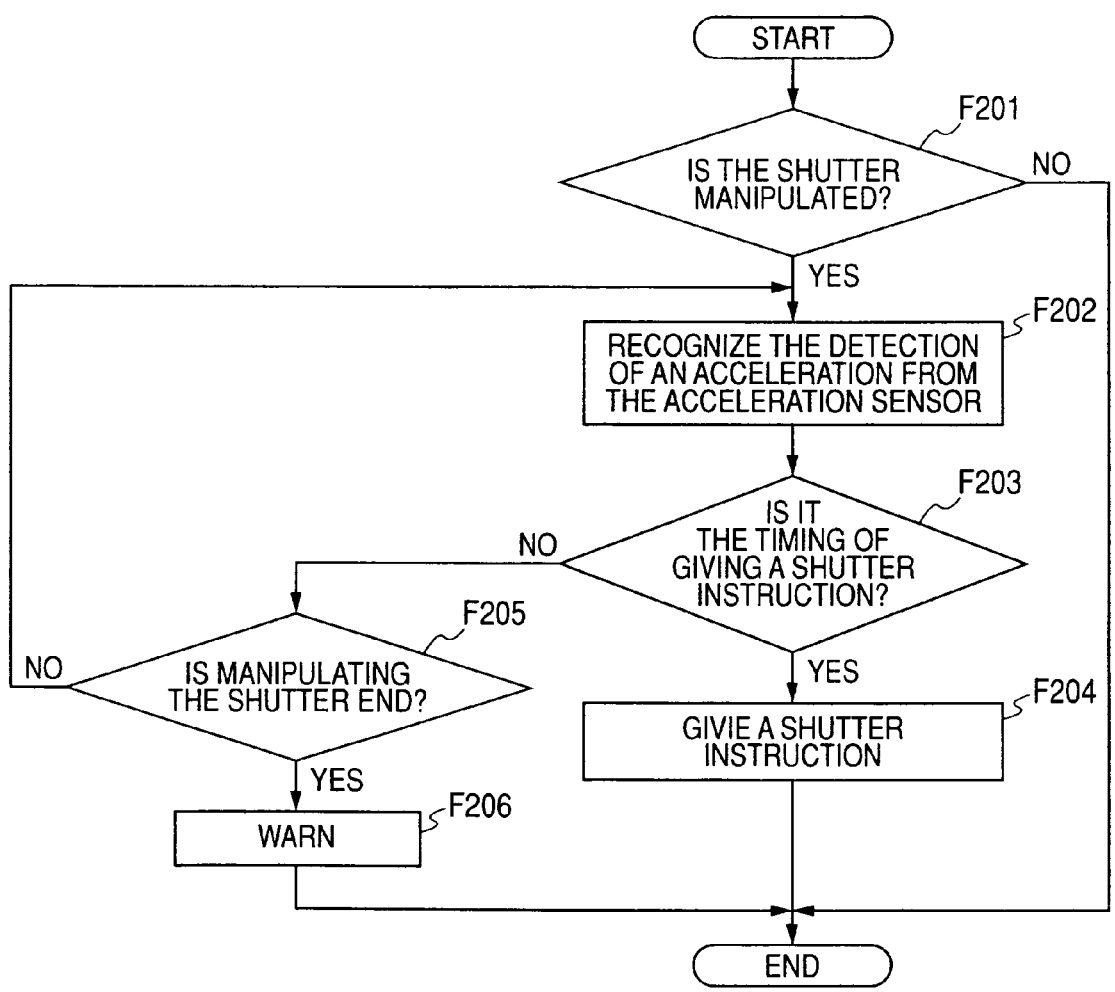
FIG. 5 shows a flow chart depicting an exemplary image stabilizing process II according to the embodiment.

The process of the system controller 2 for implementing the operation like this is shown in FIG. 5.

First, in the process from Step F201 to Step F202, the same process as the process from Step F101 to Step F102 shown in FIG. 3 is performed.

In other words, it is determined whether the user manipulates the shutter. If the user manipulates the shutter, in Step F202, the detected acceleration value of the motion of the imaging apparatus 1 itself supplied from the acceleration sensor 8 is confirmed.

Then, in Step F203, it is determined whether it is a timing of giving a shutter instruction. In this case, the timing of giving a shutter instruction is whether it is the timing corresponding to the time t10 shown in FIG. 4. In other words, it is whether to be the timing estimated a predetermined time period α before the time instant at which the detected value will be zero.

In addition, since the motion of the imaging apparatus 1 caused by the movement of the hands in taking a picture is completely changeable, unpredictable motion or halt sometimes occurs. Therefore, also in the case in which it is unable to detect the timing corresponding to the time t10 and the acceleration zero is detected, preferably, it is the timing of giving a shutter instruction.

In Step F203, if it is determined that it is not the timing of giving a shutter instruction, the process goes to Step F205.

In addition, in Step F205, the system controller 2 confirms whether the shutter manipulation is finished. More specifically, it is determined whether it is the state in which the user releases the shutter key in the manipulation input part 7 (it is determined whether the press of the shutter key is not detected). If the user is still manipulating the shutter, the process returns to Step F202.

In Step F203, if it is determined that it is the time instant a predetermined time period α before the time at which the detected value is zero, it is the timing of giving a shutter instruction, the process goes to Step F204, and then a shutter instruction is given.

Thus, in accordance with the shutter instruction, the imaging control part 4 extracts one frame of taken picture data obtained in the imaging part 3 to perform a predetermined process to make the frame an imaged still picture, and then transfers it to the storage part 9. The storage part 9 performs a process that records the transferred one frame of taken picture data on the recording medium. More specifically, "taking a picture" instructed by the shutter manipulation done by the user is performed.

In addition, even though the user finishes manipulating the shutter, the timing of giving a shutter instruction may not be sometimes detected. In this case, the process of the system controller 2 goes from Step F205 to Step F206 for a warning process. For example, the process is performed in which the sound output part 10 outputs a warning sound or a message by speech telling that it is unable to take a picture because the motion of the imaging apparatus 1 is not stopped.

As described above, the operation of the image stabilization process is performed to as well acquire taken picture data with no effect caused by the movement of the user's hands in taking a picture.

Furthermore, the system controller 2 gives a shutter instruction at the time that is estimated as a time lag a predetermined time period α before the time instant at which it is estimated that the detected acceleration value is zero, whereby taken picture data at the time at which the imaging apparatus 1 is stable in consideration of the time lag for processing can be acquired, which is also preferable in that a picture with no blur can be acquired.

4. Exemplary Imaging Process Operation III

In the exemplary imaging process operations I and II described so far, the detected acceleration value is zero or the detected acceleration value becomes the value that is estimated to be zero during the shutter manipulation period, and then a shutter instruction is given. However, on the other hand, even though the shutter manipulation is finished, it sometimes remains the state in which the shutter instruction is still not performed. More specifically, it is the case in which under the situations that the movement of the hands in taking a picture is not stopped, the process goes to Step F106 shown in FIG. 3 and Step F206 shown in FIG. 5, and then a warning telling that it is unable to take a picture is outputted.

Originally, since the imaging apparatus 1 takes a still picture in response to the user manipulating the shutter (more specifically, the timing at which the user intends to take a picture), it is not adequate so much that a taken picture is acquired/stored after the user finishes manipulating the shutter.

However, on the other hand, in the process, it is possible that taking a picture is not done because the movement of the hands in taking a picture is not stopped during shutter manipulation. In addition to this, it can be thought that the motion of the imaging apparatus 1 is often stopped immediately after the user stops manipulating the shutter.

In consideration of these, in a certain period after the shutter manipulation is finished, a picture is taken depending whether the motion caused by the movement of the hands in taking a picture is stopped, and then the possibility of taking a picture in accordance with user's intention of manipulating the shutter can be made higher even though the shutter timing is shifted more or less.

Then, an exemplary operation of the image stabilization process will be described in which an extension period is set after the shutter manipulation period is finished and taken picture data can be acquired even though the detected value becomes zero immediately after the user finishes manipulating the shutter.

As similar to FIGS. 2 and 4 described above, FIG. 6 shows changes in the detected acceleration values of the motion of the imaging apparatus 1 detected by the acceleration sensor 8 when the user manipulates the shutter.

In addition, a period from time t0 to time t20 is a shutter manipulation period during which the user is manipulating the shutter, and as similar to the shutter manipulation period shown in FIGS. 2 and 4, it is assumed that it is a period about 0.5 second to 2 seconds, for example.

Figure 6:
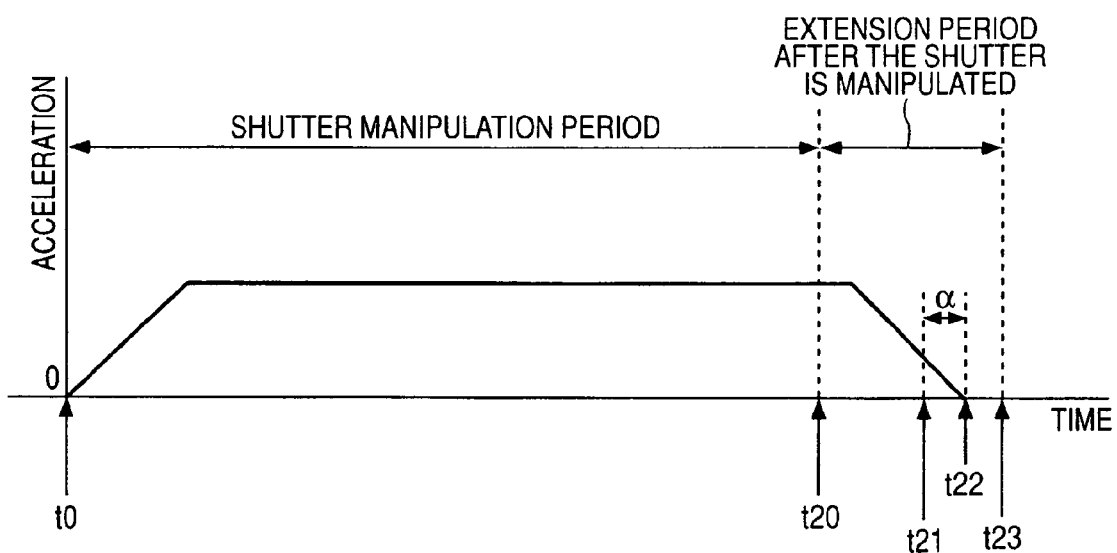
FIG. 6 shows an illustration depicting an exemplary imaging process operation III in the imaging apparatus according to the embodiment.

In the case shown in FIG. 6, during the period from the time to at which the user starts manipulating the shutter to the time t20 at which the shutter manipulation is ended, the acceleration is not zero or around zero. In the case of the exemplary imaging process operations I and II, in this situation, it is actually unable to take a picture because the timing of giving a shutter instruction is not obtained.

In this example, here, an extension period after the shutter is manipulated is set, which is a period from the time t20 at which the shutter manipulation period is finished to time t23, for example. This extension period after the shutter is manipulated is a period in which the system controller 2 performs a process that recognizes a signal supplied from the acceleration sensor 8 and gives a shutter instruction when the detected value is zero even after the shutter manipulation period is finished. For example, it is sufficient that the period is set to a period about a few seconds (for example, about one second to ten seconds).

Then, as shown in the drawing, in the case in which the detected value becomes zero at time t22, the system controller 2 gives a shutter instruction at the time t22 to control the process of acquiring taken picture data in accordance with a shutter manipulation.

Alternatively, in consideration of the time lag described in the exemplary imaging process operation II, such a scheme may be possible in which a shutter instruction is given at time t21 at which it is estimated as the time a predetermined time period α before the time t22 at which the detected value is zero.

As discussed above, the extension period is provided after the shutter is manipulated, whereby a picture of a subject can be imaged and the imaged taken picture data can be stored also in coping with the case in which the motion of the imaging apparatus 1 is stopped immediately after the user finishes manipulating the shutter.

The process of the system controller 2 for implementing this process is shown in FIG. 7. First, in the process from Step F301 to Step F305, the same process as the process from Step F101 to Step F105 shown in FIG. 3 is performed.

More specifically, in Step F301, it is determined whether the user manipulates the shutter. If the user manipulates the shutter, in Step F302, this process is performed which recognizes the detection signal of the acceleration of the motion of the imaging apparatus 1 itself detected and supplied from the acceleration sensor 8. Then, in Step F303, it is determined whether the acceleration is zero.

Furthermore, in Step F303, if it is determined that the acceleration is zero, in Step F304, a shutter instruction is given. Thus, picture data taken during the shutter manipulation period is acquired/stored.

However, as discussed above, the shutter manipulation is sometimes finished as the acceleration zero is still not detected. In this case, the process goes from Step F305 to the process after Step F306.

In Step F306, a process is performed in which a message is outputted. More specifically, since the motion of the imaging apparatus 1 is not stopped and the user finishes manipulating the shutter before a shutter instruction is given, such control is performed that the sound output part 10 is allowed to output a warning message to the user so as not to move the imaging apparatus 1. For example, a message telling that "Please do not move the apparatus", or a warning sound is outputted.

In addition, in Step F307, a process is performed in which counting an extension period after the shutter is manipulated is started. More specifically, after the time at which the user finishes manipulating the shutter, counting the extension period after the shutter is manipulated is started.

Then, in Step F308, determinations are made in Steps F309 and F310 while the process is performed which recognizes the detected acceleration value supplied from the acceleration sensor 8.

In other words, it is monitored whether the acceleration becomes zero during the extension period after the shutter is manipulated. Then, if it is determined that the detected acceleration value is zero, the process goes to Step F304, and a shutter instruction is given to perform acquiring/storing taken picture data in accordance with the shutter manipulation.

On the other hand, if the extension period after the shutter is manipulated is finished while the acceleration does not become zero, the process goes to Step F311, and a warning is outputted. For example, a message telling that it is unable to take a still picture or an electronic sound is outputted from the sound output part 10.

According to this process, even after the user finishes manipulating the shutter, it is monitored whether the acceleration becomes zero for a certain period, and a shutter instruction is given depending whether the acceleration zero is detected. Thus, the opportunity to acquire a picture with no blur is prolonged, whereby the possibility of finishing the operation as it is unable to take a picture can be reduced.

Particularly, a warning is outputted for attention in Step F306 to allow the user to stop the motion of the imaging apparatus 1 itself after the user manipulates the shutter, which increases the probability of successful imaging.

In addition, in Steps F303 and F309, it is determined whether the acceleration becomes zero. From the idea similar to the exemplary imaging process operation II, in consideration of the time lag, such a scheme may be possible in which it is determined whether it is the time that is estimated as the time a predetermined time period α before the time at which the detected value is zero.

5. Modifications

As discussed above, the embodiment of the invention has been described, but the invention should not be restricted to the embodiment described so far.

For example, such a scheme may be possible in which in the operation of the image stabilizing process described so far, the user can freely turn on/off the function by manipulating modes. The image stabilizing function is turned off, whereby the system controller 2 promptly gives a shutter instruction in response to the user manipulating the shutter, and controls the process of acquiring/storing taken picture data in accordance with the shutter manipulation.

For example, preferably, in the case in which the user as a photographer desires to intentionally obtain blurred picture data, the user manipulates modes through the manipulation input part 7 to turn off the image stabilizing function like the exemplary process.

In addition, for warning output, in the embodiment, the sound output part 10 outputs a warning in sound output. However, such a scheme may be possible in which a warning is made by outputting light with the use of a light emitting diode such as an LED. Moreover, such a scheme may be possible in which the display part 5 is allowed to display a message. Furthermore, such an exemplary process can be thought that no warning is outputted.

In addition, for the process corresponding to the shutter instruction, the imaging control part 4 extracts one frame of a picture and it is stored in the storage part 9 as taken still picture data. However, for the storage process, it may be thought that such data is sent to an external device. More specifically, such operation is also included in the storage process according to the embodiment of the invention in which a sending part is provided for an external device and taken picture data is sent and stored in the external device.

It should be understood by those skilled in the art that various modifications, combinations, sub-combinations and alterations may occur depending on design requirements and other factors insofar as they are within the scope of the appended claims or the equivalents thereof.

What is claimed is:

1. A picture imaging apparatus comprising:
an imaging means for imaging a subject picture to acquire taken picture data;
a storage processing means for storing the taken picture data acquired by the imaging means;
a motion detecting means for detecting motion of the picture imaging apparatus itself;
a manipulating means for manipulating a shutter; and
a control means for:
estimating, during a period in which the shutter is being manipulated by the manipulating means, when an amount of detected motion of the picture imaging apparatus detected by the motion detection means will become zero by comparing a current acceleration value detected by the motion detection means during the period in which the shutter is being manipulated by the manipulating means to a stored value;
determining a timing at which to perform a process in accordance with a shutter manipulation, the timing being determined based, at least in part, on the estimate of when the amount of detected motion of the picture imaging apparatus will become zero; and
instructing the imaging means to perform the process at the determined timing, wherein the instructing is performed during the period in which the shutter is being manipulated by the manipulating means.

2. The picture imaging apparatus according to claim 1, wherein in addition to a period during which the shutter is being manipulated by the manipulating means, for a predetermined period after the shutter manipulation, the control means instructs the imaging means to perform a second process in accordance with the shutter manipulation at a second timing based on a result detected in the motion detecting means.

3. The picture imaging apparatus according to claim 1, further comprising:
a warning means for outputting a warning,
wherein when the timing that instructs the process in accordance with the shutter manipulation is not obtained as the timing based on a result detected by the motion detecting means, the control means allows the warning means to output a warning.

4. The picture imaging apparatus according to claim 1, wherein the control means determines whether the current acceleration value detected by the motion detection means is decreasing from a previous acceleration value detected by the motion detection means, and wherein the control means estimates the amount of detection motion of the picture imaging apparatus will become zero only when it is determined that the current acceleration value is decreasing from the previous acceleration value.

5. The picture imaging apparatus according to claim 1, wherein the stored value is greater than zero.

6. An imaging control method for operating a picture imaging apparatus that performs acquisition of an image as a subject picture in accordance with a shutter manipulation and storing acquired picture data, the imaging control method comprising:
detecting the shutter manipulation;

detecting motion of the picture imaging apparatus itself during a shutter manipulation period;

estimating, during the shutter manipulation period, when an amount of detected motion of the picture imaging apparatus detected by the motion detection means will become zero by comparing a current acceleration value detected by the motion detection means during the shutter manipulation period to a stored value;

determining a timing at which to perform a process in accordance with a shutter manipulation, the timing being determined based, at least in part, on the estimate of when the amount of detected motion of the picture imaging apparatus will be zero; and determining a timing at which to instruct a process in accordance with a shutter manipulation, the timing being determined based at least in part on detected motion of the picture imaging apparatus;

instructing the process in accordance with the shutter manipulation at the determined timing.

7. A picture imaging apparatus comprising:

an imaging unit configured to image a subject picture to acquire taken picture data;

a storage processing unit configured to store the taken picture data acquired by the imaging unit;

a motion detecting unit configured to detect motion of the picture imaging apparatus itself;

a manipulating unit configured to manipulate a shutter; and a control unit configured to:

estimate, during a period during which the shutter is being manipulated by the manipulating unit, when an amount of detected motion of the picture imaging apparatus detected by the motion detection means will become zero by comparing a current acceleration value detected by the motion detection means during the period during which the shutter is being manipulated by the manipulating unit to a stored value;

determine a timing at which to perform a process in accordance with a shutter manipulation, the timing being determined based, at least in part, on the estimate of when the amount of detected motion of the picture imaging apparatus become zero; and instruct the imaging unit to perform the process at the determined timing, wherein the instructing is performed during the period during which the shutter is being manipulated by the manipulating unit.

* * * * *